United States Patent [19]

Martin et al.

[11] 4,211,174
[45] Jul. 8, 1980

[54] WET OXIDATION OF COAL FOR GENERATION OF HEAT ENERGY

[75] Inventors: William J. Martin, Watervliet, Mich.; Kwang-Tzu Yang, South Bend, Ind.

[73] Assignee: Whirlpool Corporation, Benton Harbor, Mich.

[21] Appl. No.: 931,570

[22] Filed: Aug. 7, 1978

[51] Int. Cl.² ............................................. F23D 19/00
[52] U.S. Cl. .................................... 110/263; 110/347; 210/63 R
[58] Field of Search ............... 110/260, 261, 263, 218, 110/327, 347; 431/2, 11, 208; 210/63, 2

[56] References Cited

U.S. PATENT DOCUMENTS

| | | | |
|---|---|---|---|
| 2,261,921 | 11/1941 | Pittman et al. | 210/2 |
| 2,665,249 | 1/1954 | Zimmermann | 210/2 |
| 2,690,425 | 9/1954 | Muses et al. | 210/2 |
| 2,944,396 | 7/1960 | Barton et al. | 60/39.05 |
| 3,155,611 | 11/1964 | Porteous | 210/86 |
| 3,482,534 | 12/1969 | Whitman | 110/347 X |
| 3,589,314 | 6/1971 | Ottensoos | 110/347 X |
| 3,682,114 | 8/1972 | Scheubel | 110/347 X |
| 3,804,756 | 4/1974 | Callahan et al. | 210/59 |
| 3,808,126 | 4/1974 | Pradt | 210/63 |
| 3,941,552 | 3/1976 | Cottell | 110/347 X |
| 4,100,730 | 7/1978 | Pradt | 60/39.05 |

Primary Examiner—Edward G. Favors
Attorney, Agent, or Firm—Hill, Van Santen, Steadman, Chiara & Simpson

[57] ABSTRACT

A process for oxidizing coal by wet oxidation to produce recoverable heat energy without generating gaseous sulfur-containing by-products. A slurry containing 0.5 or more weight percent coal particles and a stream of oxygen-containing gas are charged to a reaction zone maintained at 475° to 650° F. with pressures of 1400 to 3000 psig.

35 Claims, 2 Drawing Figures

Fig. 1

WET OXIDATION OF COAL FOR GENERATION OF HEAT ENERGY

BACKGROUND OF THE INVENTION

It is now a generally accepted view that an improved and accelerated coal utilization program represents one of the important solutions to the national energy crisis problem. However, one of the difficulties of coal utilization is that large amounts of available coal contain relatively large amounts of sulfur which, upon combustion in air, produces the environmentally harmful sulfur dioxide. In addition, the normal combustion process in air, as those in furnaces, produces sufficiently high temperatures to promote the formation of the environmentally harmful oxides of nitrogen. Furthermore, in such processes, carbon monoxide, carbon particulates, as well as fly ash, are generated in the flue gas due to essentially incomplete combustion.

These difficulties are now well recognized, and several solutions have been proposed and implemented, or are in the developmental stage. These include electrostatic precipitators, high energy scrubbers, and fluidized beds. These solutions are all very expensive, and are generally limited to large, central power generation stations.

While the wet-oxidation phenomenon has heretofore been developed into processes applicable to the disposal of solid and chemical wastes, so far as is known such has never been employed as the basis or principal for a coal combustion process. A wet oxidation coal combustion process, it is believed, would be particularly useful for coal with high sulfur content beause in the combustion process the sulfur component is converted into sulfur containing salts which are retained in the process water and thus are not discharged into the environment.

BRIEF SUMMARY OF THE INVENTION

More particularly, the present invention concerns a new process for combustion of coal, particularly coal of high sulfur content, to produce heat energy, which can then be utilized for generation of power, production of process heat, or comfort heating.

The process employs the wet-oxidation phenomenon. Pulverized coal is slurried with water, which can additionally contain, if desired, industrial process waste or raw sewage, and pumped into a reaction vessel under pressure. An oxygen containing gas is also fed into the reaction vessel. In the vessel, combustion occurs at elevated temperatures and pressures, preferably in the presence of a suitable catalyst to promote more complete combustion than might otherwise tend to occur.

One object of this invention is to provide a different combustion process from those already known to the art which process will not have associated therewith the prior art difficulties and which in addition will not require the expensive equipment associated with prior art processes such as precipitators and scrubbers so that high sulfur content coal can be used to generate heat energy for a variety of purposes without harmful effects to the environment.

Another object of this invention is to provide a coal combustion process wherein the sulfur contained in coal is oxidized into sulfur containing salts which are water soluble so that no sulfur dioxide is generated in the coal combustion process.

Another object is to provide a coal combustion process wherein fly ash and soluble sulfur containing salts can be purged out of the reactor vessel in a simple and effective manner as a part of the normal process functioning to maintain maximum combustion efficiency.

Another object of this invention is to provide a coal combustion process which utilizes temperatures which are not sufficiently high to produce oxides of nitrogen which are regarded as being environmentally harmful.

Another object of this invention is to provide an optimized new process for coal combustion utilizing wet oxidation wherein almost complete combustion of coal with heats of combustion approaching calculated values can be obtained.

An object of this invention is to provide an adaptation of the wet oxidation process for use in coal combustion wherein substantially no carbon particles or carbon monoxide is generated in the gaseous effluent.

Another object of this invention is to provide a coal combustion process adapted from wet oxidation phenomena which offers the potential of being more flexible than prior art coal combustion processes in that a system can be produced therefrom which will accommodate different load levels. Thus, as is generally known, coal burning power plants are only efficient for large plants. However, a coal combustion process such as that provided by the present invention has as one of its objectives the production of a system which is less sensitive to change in size insofar as efficiency is concerned than has heretofore been available in the art.

Another object of this invention is to provide a new and very useful process for coal combustion, particularly high sulfur coal, which can be fabricated with subassemblies which are conventional in construction and are readily available from an equipment process point of view.

Another object of this invention is to provide a new and very useful coal combustion process which can be operated at less than a specified rated heat energy capacity by simply adjusting starting material flow rates thereto (in this case, coal, an oxygen-containing gas such as air and water).

Another object is to provide a coal combustion process which can be operated using a coal slurry pipe line transport system, the coal being utilized in an "as received" condition wherein without de-watering energy losses associated with furnace combustion of coal.

Other and further aims, objects, purposes, advantages, uses, and the like for the present invention will be apparent to those skilled in the art from the present specification.

DETAILED DESCRIPTION

Figure 1:
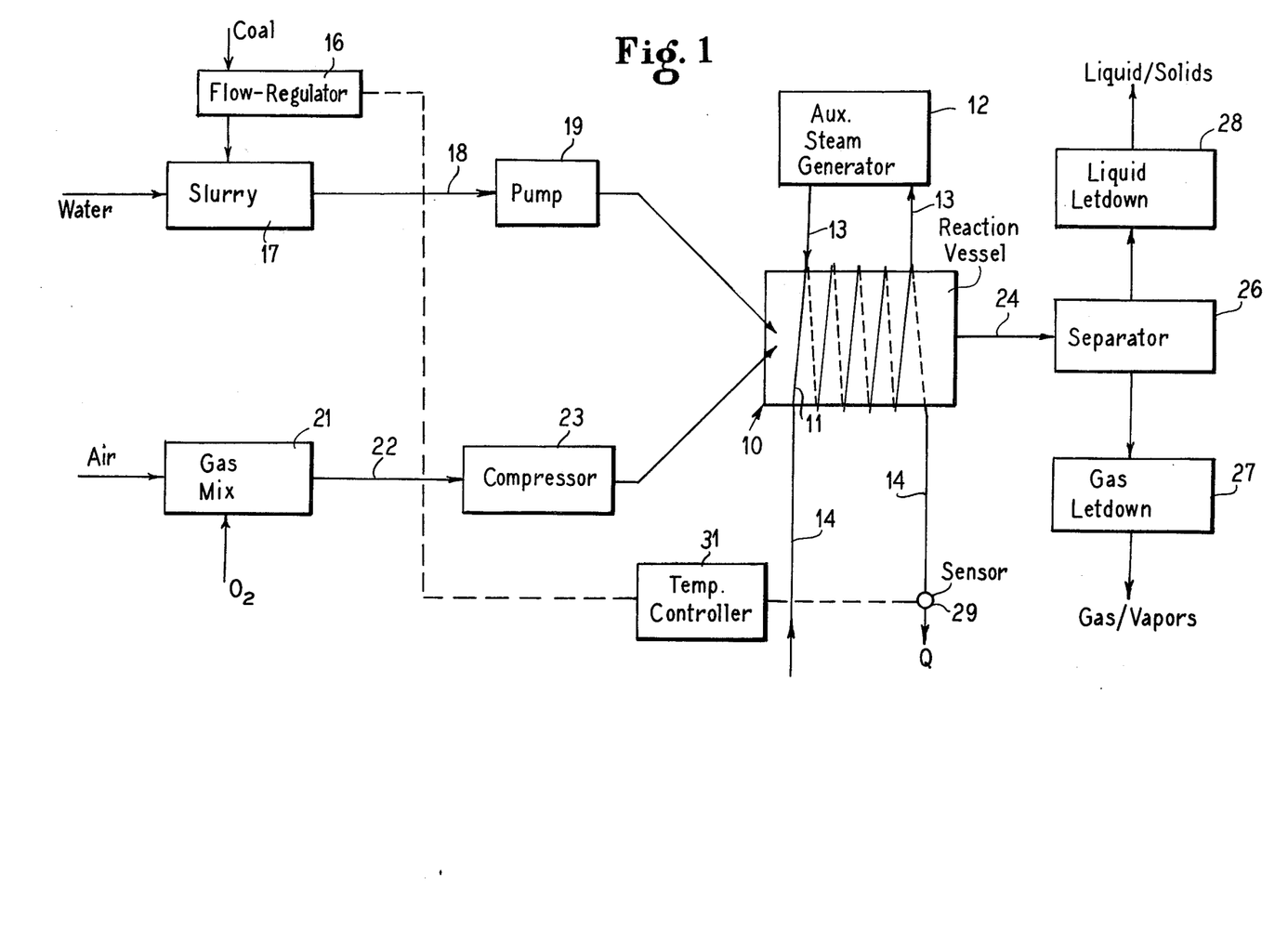
FIG. 1 shows a flow diagram of one simplified embodiment of the present invention.

In the practice of the present invention, a reaction zone is employed which can have many different physical forms but which, for example, is illustrated in FIG. 1 by the reactor 10. This reaction zone, which is maintained within a reactor such as reactor 10, is maintained during practice of the process of the present invention, at a temperature ranging from about 475° to 650° F. and concurrently at a pressure ranging from about 1400 to 3000 psig. Preferably the reaction zone is maintained at a temperature ranging from about 500° to 625° F. and at a pressure ranging from about 1800 to 2800 psig.

To such a pressurized and heated reaction zone is charged an aqueous slurry which is itself pressurized to a value ranging from about 1400 to 3000 psig. Optionally, but preferably, such slurry before being so-charged is pre-heated; convenient pre-heating temperatures range from about 150° to 500° F. although higher and lower pre-heating temperatures can be employed as those skilled in the art will appreciate. Such an aqueous slurry may contain from about 0.5 to 3.0 or more weight percent of coal on a 100 weight percent total slurry basis. The coal is substantially in the form of particles having sizes less than about 0.02 inch each. The aqueous slurry so charged may contain from about 0.8 to 2.7 or more weight percent of coal on a 100 weight percent total slurry basis and preferably the coal is in the form or particles at least 90% of which range in size from about 0.001 to 0.01 inch on a 100 weight percent total coal weight basis.

As those familiar with coal will appreciate, while such material is predominantly carbon, coal is not a uniform material but contains moisture and varying amounts of sulfur, hydrogen, and oxygen. Sulfur occurs in coal in three forms: (1) combined with iron as pyrite or marcasite, (2) organic sulfur, and (3) sulfate sulfur or sulfur combined with iron or calcium together with oxygen as $FeSO_4$ or $CaSO_4$. Sulfur seldom occurs in the free state in coal. Normally, organic sulfur will constitute anywhere from about 20 to 85% of the total sulfur content of a given coal. Sulfate sulfur usually is found in weathered coal. Types of coal usable in the process of the present invention include anthracite, sub-anthracite, bituminous (including HV, MV, and LV) sub-bituminous and the like. Typically, coal can contain from about 0.2 to 7 or even more weight percent of sulfur (on a total coal weight basis). Coal which contains a sulfur content greater than about 2.6 weight percent is commonly known as "high sulfur" coal. Because of the circumstance that the process of the present invention enables one to combust coal without generation of gaseous sulfur by-products, high sulfur coal represents a presently preferred starting material for use in the practice of this invention.

Coal is commonly rated as having a heat of combustion at about 25° C. and constant pressure ranging from about 65 to 95K cal./mole (or about 4300 to 14000 btu's per pound) where the heat of combustion is the quantity of heat liberated per unit mass when the coal is completely burned (oxidized). The heat of combustion is conveniently measured with a bomb calorimeter in the case of coal.

Operations utilizing the process of the present invention in the preferred self-sustaining mode requires that sufficient solid fuel, in the form of pulverized coal or other oxidizable organic material, must be present in the slurry to supply the necessary combustion heat to compensate for heat losses, heat exchanger inefficiency and energy removed by way of the effluent stream. The required concentration of coal for this purpose will vary somewhat with operating conditions and equipment construction. However, it has been found that a coal slurry concentration of typically about 5 or 6 or more weight percent will ensure self-sustaining operation. Coal slurry concentrations above 6 weight percent will provide additional steam energy output for useful work. As those skilled in the art will appreciate, the self-sustaining mode is a particularly preferred mode when power generation is contemplated as opposed to oxidation of waste materials without recovery of usable energy.

To prepare an aqueous slurry for use in the practice of the present invention any convenient procedure can be followed. One preferred present procedure is to pulverize the coal to the particle sizes above indicated, as in a commercial pulverizer, after which the coal is slurried with water in a convenient slurry tank. This slurry is then delivered, by gravity flow, pumping, or the like, to a motor driven high pressure pump or to a gas driven high pressure pump which pressurizes the slurry to a desired value within the range above indicated. Between such pump and the reaction zone preheating optionally can take place.

In addition, a gas is charged to the reaction zone under a pressure ranging from about 1400 to 3000 psig. Such gas contains at least about 10 weight percent of oxygen on a 100 weight percent total gas basis and can comprise 100 weight percent oxygen. Typically and preferably the gas so charged comprises from about 20 to 100 weight percent oxygen with the balance up to 100 weight percent thereof being an inert gas such as nitrogen, carbon dioxide, or the like, principally. One convenient charging gas composition comprises from about 20 to 80 weight percent inert gas with the balance up to 100 weight percent thereof being oxygen. Such a gas can be prepared by enriching air with oxygen as those skilled in the art will appreciate.

In the reaction zone, the slurry and the gas are admixed, preferably under turbulent flow conditions. Also, in the reaction zone, the quantity of oxygen maintained in the reaction zone is is stoichiometrically in excess of the amount of oxidizable components present in the reaction zone. For example, in a simple embodiment of the present invention, the heat of combustion of a starting coal is known from which the amount of oxygen needed for substantially complete oxidation can be calculated. Then the flow rates of gas relative to charged slurry are adjusted so as to always maintain such a stoichiometric excess. In a more complicated embodiment of the present invention, the quantity of oxygen present in effluent from the reaction zone can be measured and by conventional feed-back control principles the quantity of oxygen charged can be so regulated as to maintain in the effluent a predetermined excess of oxygen based upon a definite rate of coal charging. Any convenient means, as those skilled in the art will appreciate, can be used to maintain the quantity of oxygen present stoichiometrically in excess of the amount of oxidizable components present in the reaction zone. A resulting reaction mixture is removed from the reaction zone. The rate of removal can be substantially constant or can be varied. In general, the rate of removal is always such that the reaction zone does not become overfilled with reactants and reaction products. In one convenient and preferred mode of operation, the respective rates of charging of slurry and gas are adjusted so as to approximately equal a rate of removal of reactant product from the reaction zone so that a relatively constant quantity of material is maintained in the reaction zone.

Concurrently, the respective rates of slurry charging and gas charging and reactant mixture removal is controlled so as to produce in the reaction zone a residence time for the components present in the reaction zone which is at least sufficient for generating in the reaction zone an approximately equilibrium composition of oxidizable components and oxidized components at the desired reaction zone temperature and the desired reaction zone pressure. In addition, such residence time is also at least sufficient to sustain in the reaction zone such desired reaction zone temperature and reaction zone pressure.

As those skilled in the art will appreciate, an equilibrium composition of oxidizable components and oxidized components in the reaction zone can be made to vary depending upon process operating conditions, feed stocks employed, presence of and type of catalyst in the reaction zone, and the like. Obviously, for reasons of process efficiency, it is desired to achieve, in any given operating configuration, a maximize heat of combustion so that a substantially complete oxidation approaching 100 percent of the coal charged is achieved. In general, it is preferred to achieve at least an 80% heat of conversion based on the total calculated heat of combustion achievable from a given starting coal. Preferably at least a 90 percent production of calculated heat of combustion is produced and still more preferably at least a 95 percent of the calculated heat of combustion coal is produced.

Preferably, in the operation of an embodiment of a process of the present invention, a resulting reactant mixture so removed from the reaction zone is characterized by having substantially all of the sulfur present in the starting coal present in such resulting reactant mixture as water soluble, sulfur containing, oxygen containing inorganic salts, such as sulfites and sulfates.

A reactant mixture removed from the reaction zone can be conventionally processed. Presently it is preferred to separate gaseous compounds from a separated reactant mixture and thereafter the gaseous components and the liquid and suspended solid components are let down.

As combustion is occurring in the reaction zone, as indicated above, a heat exchange fluid may be moved in a heat exchangeable relationship relative to the reaction zone past the reaction zone at a rate sufficient to remove from the reaction zone the heat energy produced in the reaction zone which is in excess of that needed to sustain in the reaction zone the desired reaction zone temperature and the desired reaction zone pressure. Preferable heat exchange fluids are water, steam, and air.

The heated heat exchange fluid can then be used for generation of power, production of process heat, or comfort heating.

Alternatively, the heat energy produced in the reaction zone may be removed therefrom in a mode not involving heat exchange with the reaction zone such as by transfer of heat energy in the form of reactor steam to a point of use, or via heat exchange with the effluent line downstream of the reaction zone.

It is noted that electrical power generation would typically require a system incorporating superheating of steam. Operating temperatures for the process of the present invention are characteristically limited thermodynamically to values which are suitable for space heating and/or process steam.

In one preferred mode, the heat exchange fluid is subjected to pre-heating by being placed into a heat exchangeable relationship with the reactant mixture before the heat exchange fluid is moved past the reaction zone, as described.

During start-up, a reaction zone is initially heated to a temperature of from about 400° to 700° F. to initiate occurrence of a self-sustaining reaction in the reaction zone. Such an initial heating can be achieved by using a source of auxiliary steam which is moved through tubing, or the like, jacketing the reactor used to define the reaction zone. Sometimes the same tubing can be employed both for the pre-heating operation as well as for the heat exchange operation used to remove heat energy from the reaction zone during operation of the process of the present invention. Preferred start-up conditions involve the use of temperatures of from about 475° to 650° F. during initiation of a self-sustaining reaction in the reaction zone.

While in one preferred mode of practicing the present invention a starting aqueous slurry is comprised of from at least 6.0 weight percent of coal with the balance up to 100 weight percent being water, it is a distinct feature and advantage of the present invention that, in addition to coal, a starting aqueous slurry can have dispersed therein waste material, preferably organic in composition, derived from any convenient or available source, including, for examples, raw sewage, organic industrial wastes, animal rendering plants, etc. Thus, in general, an aqueous slurry usable as a starting material in the practice of the present invention can be comprised, on a 100 weight percent total weight basis, of (a) from about 0.5 to at least 6.0 weight percent of coal having a sulfur content of at least about 2.6 weight percent based on 100 weight percent total coal weight, (b) from 0 to about 10 weight percent of organic sulfur-free waste material, (c) from 0 to about 10 weight percent of sulfur-containing waste material, and (d) from about 74 to 99.5 weight percent water.

Any particulate material present in such a starting aqueous slurry has particle sizes comparable to those above explained for coal.

In general the process of the present invention competes with standard fossil fuel-fired boilers and with newly developed fluidized bed-type combustion boilers. The lack of air pollutants escaping from a system practicing the present invention, as compared to a standard coal fired boiler, constitutes a main advantage of such a system.

Referring to FIG. 1, there is seen a reactor 10 constructed for example, in the manner of a tube comprised of stainless steel which is jacketed with tubing 11 coiled thereabout, the tubing 11 being comprised of stainless steel or the like.

For purposes of start-up an auxiliary steam generator 12 is provided which is adapted to provide a source of heat. Thus, auxiliary generator 12 is connected to tubing 11 via tubes 13 and appropriate valves (not detailed). After start-up has been achieved in reactor 10, tubing 13 is valved off and tubing 14 is connected to coil tubing 11 by means of valves (not detailed) whereupon the coiled tubing 11 has circulated therethrough via tubing 14 a heat exchange medium such as water. The rate of circulation of coolant fluid through tubing 14 and tubing 11 is such, that during operation of reactor 10, heat can be removed therefrom at a rate sufficient to maintain the temperature of the reactor 10, along with the associated pressure therein, at nearly predetermined and desired values, for example.

Pulverized coal is charged through a flow regulator 16 to an agitator equipped slurry tank 17 to which water is likewise supplied thereby to form a starting slurry of predetermined composition. This slurry is pumped from tank 17 into reactor 10 by line 18 via pump 19.

A gas mixture is prepared in a mixing chamber 21 here illustratively shown to be air and oxygen as the starting gases. From chamber 21 the oxygen containing gas is fed into the reactor 10 through line 22 by compressor 23 at a desired pressurization. Form reactor 10 an effluent is conveyed by a line 24 to a liquid gas separator 26 wherein gaseous components of the effluent are separated from the liquid components containing dissolved and suspended solids. From separator 26, the gas and the liquid system are each depressurized in conventional let-down apparatus 27 and 28, respectively.

As is typical of combustion furnaces, reaction vessel 10 is designed to operate at a maximum rate of heat of combustion per unit of time based upon a calculated total heat of combustion associated with a particular class of coal starting material. Less than the rated heat energy capacity can be accommodated in the system shown in FIG. 1 by simply adjusting the coal gas and water flow rates in reactor vessel 10.

For example, a sensor 29 located across tubing 14 on the out-flow side of coiled tubing 11 can be used to continuously measure the temperature of the heat transfer fluid flowing therein. When such temperature falls below a set point in temperature controller 31 then automatically the volume of coal fed through flow regulator 16 to slurry 17 is increased. Thus, the rates of flow in lines 18, 22 and 24 can be maintained at substantially constant values with an excess amount of oxygen stoichiometrically being continuously charged to reactor 10. When the amount of coal charged to the reactor 10 in slurry 17 is increased, more heat is generated in reactor 10 thereby raising the temperature of the reactor 10 and increasing the amount of heat transferred from reactor 10 via coiled tubing 11 to line 14 thereby raising the temperature sensed by sensor 29.

When the temperature sensed by sensor 29 exceeds a predetermined set point, the temperature controller 31 signals the flow control regulator 16 to reduce the amount of coal supplied to slurry tank 17 which results in a decrease in the amount of oxidizable material fed to the reactor 10 and thereby resulting in a lowering of the temperature of the heat transfer medium moving through line 14 in the vicinity of sensor 29, as desired. Thus, nearly steady state temperature and heat generating conditions are provided by the system shown in FIG. 1, if desired.

Figure 2:
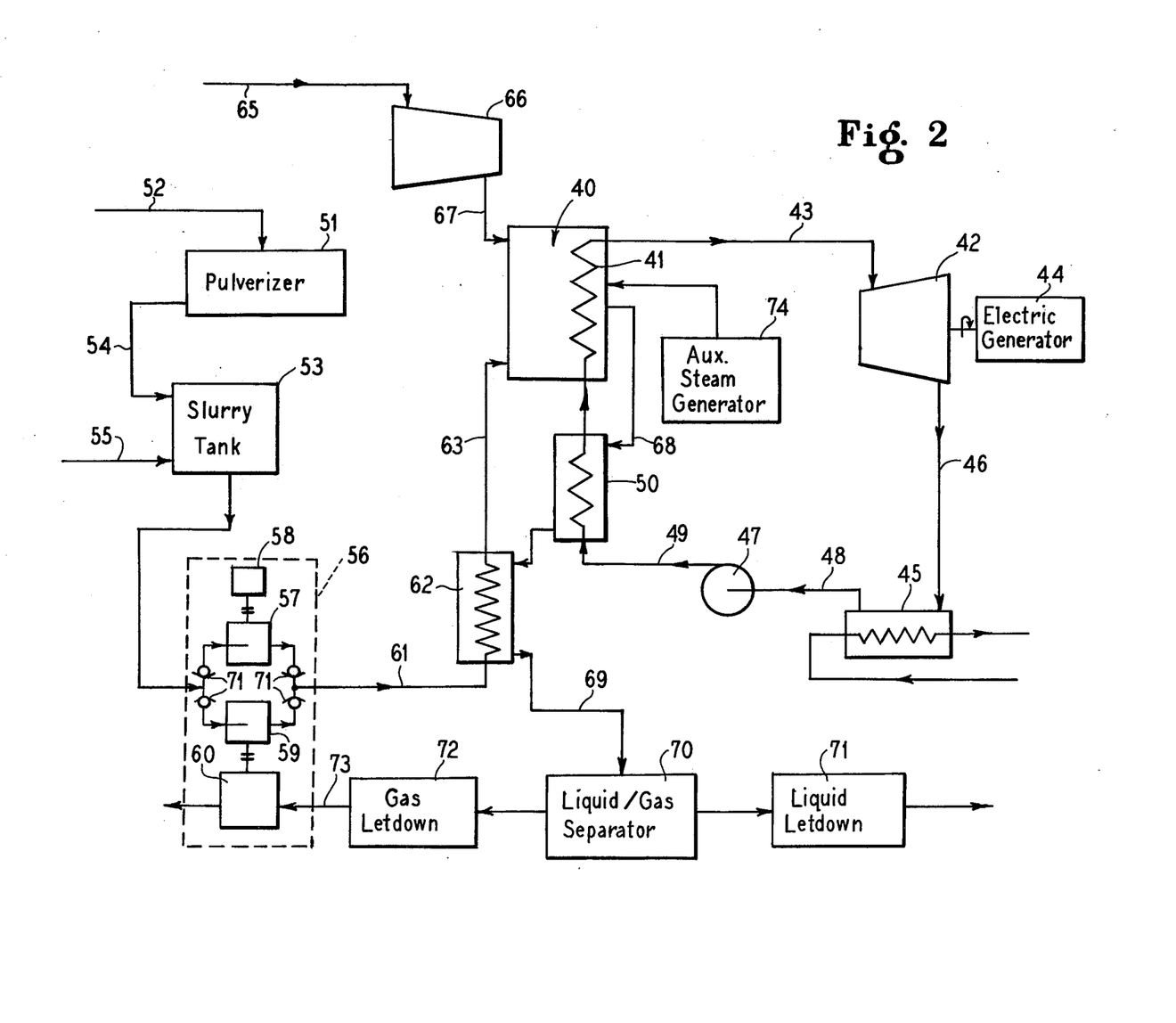
FIG. 2 shows a flow sheet for another, larger-scale embodiment of the present invention.

Referring to FIG. 2 there is seen another embodiment of the present invention which employs a reactor vessel 40 having steam evaporator tubes located therewithin. The evaporator tubes 41 are combined into a closed loop system for steam generation wherein the reactor vessel 40 becomes the boiler. Steam passes through a turbine 42 from the tubes 41 via a line member 43. The turbine 42 is illustratively shown as powering an electric generator 44.

Spent steam from turbine 42 is fed to a condensor 45 via a line 46. Conveniently, condensor 45 uses cooling water, as from a reservoir pond or the like, as desired. Condensate from condensor 45 is returned to tubes 41 by feed pump 47 and lines 48 and 49. In line 49 between feed pump 47 and evaporator tubes 41 is located a preheat heat exchanger 50 wherein the effluent from reactor vessel 40 is used as a source of heat to improve efficiency and conserve energy.

Coal is charged continuously to a pulverizer 51 through a feed line 52, and in pulverizer 51 a predetermined comminution of starting coal lumps is accomplished. Conveniently pulverizer 51 is fed coal by a screw conveyor or the like and finely divided coal is conveyed from pulverizer 51 to a slurry tank 53 by a pneumatic line 54, or the like. Water is fed to slurry tank 53 via a line 55 with the respective rates of addition of coal and water to slurry tank 53 being maintained so as to produce a predetermined composition of coal and water in slurry tank 53. From tank 53 the slurry is conveyed by gravity (or by pump, not detailed) to a high pressure pump system herein designated in its entirety by the numeral 56.

Pump system 56 employs a high pressure pump 57 which is driven by a motor 58 and also a high pressure pump 59 which is driven by a gas pump 60, as will be more fully hereinafter explained. The pressurized slurry from the pump system 56 is delivered by line 61 to a heat exchanger 62 wherein the now pressurized slurry is pre-heated by effluent from reactor 40. From heat exchanger 62 the now heated slurry is delivered directly to the reactor vessel 40 via line 63.

Air (preferably filtered to remove contaminants) is fed via a line 65 to a gas compressor 66 wherein the air is compressed to a predetermined level matching the pressures generally being maintained within reactor vessel 40 and compressed gas from compressor 66 is charged to reactor vessel 40 via line 67.

Effluent from reactor vessel 40 is removed through a line 68 and used in the pre-heat heat exchanger 50 as indicated, after which the effluent is conducted to the reactor feed heater heat exchanger 62 and used to pre-heat slurry, as indicated. From the heat exchanger 62 the effluent is conveyed via a line 69 to a conventional liquid gas separator 70 wherein gaseous components in the effluent stream and separated from liquid components and solid particulate matter dispersed in the liquid phase. Thereafter the pressure of the liquid phase is let down in let-down zone 71 by conventional means.

The gas separated from the effluent is partially reduced in pressure by a gas let-down zone 72 and then this gas is used to power the gas pump 60 when the apparatus is functioning. Operation of the gas pump 60, in turn, is used to operate the high pressure pump 59. Appropriate check valves 71 are employed to separate functionally pump 57 from pump 59, as those skilled in the art will appreciate.

In operation, an auxiliary steam generator 74 may be arranged to supply a jacket (not detailed) associated with the reactor vessel 40 so that such reactor vessel 40 can be pre-heated to a temperature sufficient to initiate a self-sustaining oxidation reaction therewithin. It will also be appreciated that direct injection of steam into the reactor vessel 40 may be utilized for pre-heating the effluent in the reactor.

At start-up, predetermined constant feed rates can be established in respective lines 67, 63 and 68. As start-up is completed the effluent rises in temperature so that pre-heating can be accomplished in the respective heat exchangers 50 and 62. In the start-up period, the high pressure pump 57 is operated by motor 58 so as to charge slurry to the reactor vessel 40. Operation of the pump 57 is continued until the gas pressure and gas flow rate from gas let-down 72 in conduit 73 is sufficient to operate the gas pump 60 at which point in operation the high pressure pump 59 is brought on-stream while pump 57 and motor 58 are placed on a stand-by basis.

In practicing the present invention it has been found advantageous to employ a catalyst for promoting the oxidation of coal. For example, a suitable catalyst for use in practicing the present invention comprises manganese oxide, particularly a supported copper-manganese oxide catalyst material such as disclosed in Example 1 of the co-pending patent application of Robert B. Wheaton, John A. Nelson, and Donald E. Scherpereel Ser. No. 927,277 filed July 24, 1978 assigned to the same assignee as the present invention. Mixed oxides of manganese with other metals can also be used, such as nickel manganese oxide, cobalt manganese oxide, cerium manganese oxide, and the like, all as disclosed in the aforesaid patent application of Wheaton, Nelson, and Scherpereel.

While the present invention has been described herein in terms of coal as the starting material, it will be recognized that other solid fuels such as lignite, coke, peat or the like may also be suitable fuels for use in the practice of the present invention.

The above description of the present invention includes an aqueous coal slurry containing from about 0.5 to 3.0 weight percent of coal on a 100 weight percent total slurry basis, and an aqueous coal slurry containing at least 6.0 weight percent of coal on a 100 weight percent total slurry basis for self-sustaining operation. It will also be recognized by those skilled in the art that the present invention includes the use of a continuously feedable aqueous coal slurry comprising about 45 to 55 weight percent of particulate coal with the balance up to 100 weight percent being water. Such an aqueous coal slurry of 50% coal solids is used for transporting coal in coal slurry pipeline transport systems, and therefore the coal may be utilized in an "as received" condition therein without de-watering energy losses associated with furnace combustion of coal. Of course, the quantity of oxygen supplied to the reaction zone must be stoichiometrically in excess of the amount of oxidizable components present in the reaction zone, and pure oxygen may advantageously be employed to achieve this with a coal slurry containing about 50 weight percent of coal.

In employing the present invention the concern for sulfur is that it not be converted to $SO_2$ by oxidation at high temperatures. Sulfur compounds that do not undergo conversion (oxidation) during the reaction would remain as inorganic sulfides such as, for examples, pyrite, marcasite, etc.; as soluble or insoluble organic sulfides or as inorganic sulfate. These non-oxidized sulfur compounds would remain in solution or in particulate form in the reaction mixture and would be removed from the system harmlessly with the spent liquid effluent. They would not be vented as environmental air pollutants. Thus, incomplete coal oxidation in employing the present invention does not imply oxidation of sulfur compounds to $SO_2$.

EMBODIMENTS

The present invention is further illustrated by reference to the following examples. Those skilled in the art will appreciate that other and further embodiments are obvious and within the spirit and scope of this invention from the teachings of this present example taken with the accompanying specification.

EXAMPLE 1

Bituminous coal sample was found to have the following ultimate analysis:

ULTIMATE ANALYSIS

|  | As rec'd | Dry |
|---|---|---|
| % Moisture | 8.32 | xxxxx |
| % Carbon | 68.99 | 75.25 |
| % Hydrogen | 4.76 | 5.19 |
| % Nitrogen | 1.57 | 1.71 |
| % Chlorine | 0.14 | 0.15 |
| % Sulfur | 2.04 | 2.23 |
| % Ash | 6.91 | 7.54 |
| % Oxygen (diff) | 7.27 | 7.93 |
|  | 100.00 | 100.00 |
| btu/lb. | 12433 | 13561 |

This coal was micropulverized so as to have a particle size distribution such that at least 90 weight percent thereof range in size from about 0.001 to 0.10 inch on a 100 weight percent total coal basis.

An aqueous slurry comprised of deionized water and about 0.5 weight percent (on a total slurry weight bases) was prepared and pumped at a pressure of 1600 psig into one end of a tubular reactor.

Concurrently air under a pressure of 1600 psig was charged into the same end of such reactor.

This was a small scale test and the reactor had an internal diameter of about 2 inches and an internal length of about 14 inches. The interior of the reactor was charged with the manganese oxide catalyst described in Example 1 of the aforesaid patent application of Wheaton, Nelson, and Scherpereel.

The test system consisted of a high pressure pump, heat exchanger, electric pre-heater, reactor, air compressor, pressure let-down valve, associated valves and piping and an automatic control system including temperature sensors and pre-heater controls.

For each of a series of test runs, the influent coal/water slurry was injected into this test system at about 1600 psig by the high pressure pump. Air from the air compressor was added to the system at 1600 psig and mixed with the influent coal/water slurry. This two-phase mixture was passed through the heat exchanger where it was heated to about 480° F. by the hot effluent mixture leaving the system. The heated influent was then passed through the pre-heater where it was raised to reaction temperature (approximately 550° F.). The mixture was then passed into the catalyst-filled reactor for a residence time of about two (2) minutes. During this time about 97% of the organic material in the coal was oxidized to carbon dioxide and water. Heat was released by the oxidizing coal.

Most tests were conducted with coal slurry fuel levels intentionally too lean to achieve a self-sustaining reaction. Such tests shown the process of the invention is suitable for use in non-self-sustaining systems. Also these tests permit regulation of the reaction temperature during a test and, in addition, simplify some of the analytical measurements. When rich fuel levels were used and self-sustaining reactions were achieved, this condition was evidenced by the ability of the system to maintain a reaction temperature of at least 550° F. for an extended period of time (i.e. indefinitely) with the pre-heater off; i.e., all heat energy input to the system was obtained from the oxidizing coal.

The need for auxiliary heat was sensed by the automatic control system. Consequently, during start up, as the combustion heat from oxidizing coal approached the self-sustaining level, the control system automatically reduced and finally shut off the auxiliary heat at the point of self-sustaining operation.

Chemical analysis of the product liquid with suspended solids disclosed that substantially all of the sulfur present in the starting coal had been converted into inorganic sulfates and also that the starting coal had been over 97 percent converted (oxidized).

A larger system could suitably be heated by direct steam injection or by a steam jacket surrounding the reactor. This auxiliary steam heat would replace the heat provided by the electric pre-heater in the text system described above. Steam, therefore, would be used to supply heat for the system start-up and would be shut off when oxidation of the coal provided enough heat to achieve a self-sustaining reaction.

EXAMPLE 2

Simple Reactor Without Regenerative Heat Exchanger

A well mixed reactor, corresponding to reactor 10 in FIG. 1 with associated components as indicated in FIG. 1 and the preceding description is employed. Air in sufficient quantity to provide 30% excess oxygen is compressed by a fourstage compressor to 1600 psia and enters the reactor at 336° F. and 2.7% relative humidity. Water at 80° F. and pulverized coal are also fed into the reactor at 1600 psia. The reactor is operated at 88.7% combustion of coal (10 pounds carbon unburned per 100 pounds of coal) at a reactor temperature of 500° F. and 1600 psia. The ash is removed in a 20% by weight water slurry which also serves as a bleed on the reactor and maintains low levels of sulfate and sulfite concentrations in the reactor. To maintain steady state oxidation, heat must be removed from the reactor.

Although various minor modifications may be suggested by those versed in the art, it should be understood that we wish to embody within the scope of the patent warranted hereon all such modifications as reasonably and properly come within the scope of our contribution to the art.

We claim:
1. A process for oxidizing coal to produce recoverable heat energy without generating gaseous sulfur-containing by-products comprising the steps of simultaneously and continuously:
   (A) maintaining a reaction zone at a temperature ranging from about 475° to 650° F. and at a pressure ranging from about 1400 to 3000 psig,
   (B) charging to said reaction zone an aqueous slurry containing from about 0.5 to about 50.0 weight percent of coal on a 100 weight percent total slurry basis, said coal being substantially in the form of small particles, at a pressure of from about 1400 to 3000 psig,
   (C) charging to said reaction zone a gas containing from about 10 to 100 weight percent of oxygen on a 100 weight percent total gas basis at a pressure ranging from about 1400 to 3000 psig,
   (D) admixing said slurry and said gas in said reaction zone,
   (E) removing the resulting reactant mixture from said reaction zone,
   (F) controlling the respective rates of said slurry charging, said gas charging, and said removing to produce in said reaction zone a residence time for the components present in said reaction zone which is at least sufficient for generation therein of an approximately equilibrium composition of oxidizable components and oxidized components at said reaction zone temperature and said reaction zone pressure, and
   (G) removing from said reaction zone the heat energy produced in said reaction zone which is in excess of that needed to sustain in said reaction zone said reaction zone temperature and said reaction zone pressure.

2. The process of claim 1 wherein the quantity of oxygen present in said reaction zone is maintained stoichiometrically in excess of the amount of oxidizable components present in said reaction zone.

3. The process of claim 1 wherein a combustion catalyst is present in said reaction zone and said resulting reactant mixture is brought into contact with same.

4. The process of claim 1 wherein said coal initially contains at least about 2.6 weight percent sulfur.

5. The process of claim 1 wherein in said resulting reactant mixture, so removed from said reaction zone, substantially any sulfur present in said coal initially is present as water-soluble or water-insoluble sulfur containing, oxygen containing inorganic salts.

6. The process of claim 1 wherein said reaction zone is so maintained at a temperature ranging from about 500° to 625° F. and at a pressure ranging from about 1400 to 2800 psig.

7. The process of claim 1 wherein the respective rates of said slurry charging, said gas charging, and said removing are controlled to produce in said reaction zone a residence time for the components present in said reaction zone which is at least sufficient for sustaining said reaction zone temperature and said reaction zone pressure.

8. The process of claim 1 wherein said aqueous slurry as so charged contains at least an amount of coal sufficient to sustain in said reaction zone a self-sustaining liquid-phase coal oxidation reaction.

9. The process of claim 1 wherein said aqueous slurry as so charged contains at least 6.0 weight percent of coal on a 100 weight percent total slurry basis and said coal being in the form of particles.

10. The process of claim 1 wherein said aqueous slurry as so charged contains coal in the form of particles at least 90 weight percent of which range in size from about 0.001 to 0.01 inch on a 100 weight percent total coal basis.

11. The process of claim 2 wherein said gas as so charged comprises from about 20 to 90 weight percent oxygen with the balance up to 100 weight percent thereof being an inert gas.

12. The process of claim 2 wherein said gas as so charged comprises from 0 to about 20 weight percent of inert gas with the balance up to 100 weight percent thereof being oxygen.

13. The process of claim 1 wherein said gas comprises air enriched with oxygen.

14. The process of claim 1 wherein said admixing is carried out turbulently.

15. The process of claim 1 wherein, after said resulting reactant mixture is so removed from said reaction zone, gaseous components thereof are separated from liquid and suspended solid components are let down.

16. The process of claim 1 wherein, in said reaction zone, at least about 80% of the calculated heat of combustion of said coal is produced.

17. The process of claim 12 wherein, in said reaction zone, at least about 90% of the calculated heat of combustion of said coal is produced.

18. The process of claim 13 wherein, in said reaction zone, at least about 95% of the calculated heat of combustion of said coal is produced.

19. The process of claim 1 wherein said heat exchange fluid is water.

20. The process of claim 1 wherein said heat exchange fluid is steam.

21. The process of claim 1 wherein said heat exchange fluid is air.

22. The process of claim 1 wherein said coal is initially pulverized, then slurried with water, and then such slurry is passed through a high pressure pumping zone before being so charged to said reaction zone.

23. The process of claim 7 wherein, in starting up, said reaction zone is initially heated to a temperature of from about 475° to 650° F. to initiate a self-sustaining reaction therein.

24. The process of claim 1 wherein a heat exchange fluid is subjected to preheating by being placed into a heat exchangeable relationship with said so removed resulting reactant mixture before said heat exchange fluid is so moved.

25. The process of claim 1 wherein a heat exchange fluid is moved in a heat exchangeable relationship relative to said reaction zone past said reaction zone at a rate sufficient to remove from said reaction zone the heat energy produced in said reaction zone which is in excess of that needed to sustain in said reaction zone said reaction zone temperature and said reaction zone pressure.

26. A process for oxidizing coal to produce recoverable heat energy without generating gaseous sulfur-containing by-products comprising the steps of simultaneously and continuously:
(A) maintaining a reaction zone at a temperature ranging from about 475° to 650° F. and at a pressure ranging from about 1400 to 3000 psig,
(B) charging to said reaction zone an aqueous slurry containing at least about 0.5 weight percent of coal on a 100 weight percent total slurry basis, said coal being substantially in the form of particles having sizes less than about 0.02 inch each, at a pressure of from about 1400 to 3000 psig,
(C) charging to said reaction zone a gas containing from about 10 to 100 weight percent of oxygen on a 100 weight percent total gas basis at a pressure ranging from about 1400 to 3000 psig,
(D) maintaining the quantity of oxygen present in said reaction zone stoichiometrically in excess of the amount of oxidizable components present in said reaction zone,
(E) admixing said slurry and said gas in said reaction zone,
(F) removing the resulting reactant mixture from said reaction zone,
(G) controlling the respective rates of said slurry charging, said gas charging, and said removing to produce in said reaction zone a residence time for the components present in said reaction zone which is at least sufficient for generation therein an approximately equilibrium composition of oxidizable components and oxidized components at said reaction zone temperature and said reaction zone pressure and which is at least sufficient also for sustaining said reaction zone temperature and said reaction zone pressure, and
(H) moving a heat exchange fluid in a heat exchangable relationship relative to said reaction zone past said reaction zone at a rate sufficient to remove from said reaction zone the heat energy produced in said reaction zone which is in excess of that needed to sustain in said reaction zone said reaction zone temperature and said reaction zone pressure.

27. The process of claim 26 wherein said aqueous slurry is comprised, on a 100 weight percent total weight basis of
(A) from about 6.0 to 50.0 weight percent of coal having a sulfur content of at least about 2.6 weight percent based on 100 weight percent total coal weight,
(B) from 0 to about 10 weight percent of organic waste material,
(C) from 0 to about 10 weight percent of sulfur containing waste material, and
(D) from about 74 to 99.5 weight percent water.

28. The process of claim 27 wherein said sulfur containing waste material is derived from paper and/or paper pulp processing.

29. The process of claim 27 wherein said organic waste material and said sulfur containing waste material is derived from sewage.

30. The process of claim 27 wherein said organic waste material is derived from a slaughter house waste effluent.

31. The process of claim 27 wherein said organic waste material is industrial waste.

32. Apparatus for oxidizing coal to produce recoverable heat energy without generating gaseous sulfur-containing by-product comprising in combination
(A) a reactor vessel having an interior reaction zone, including means for maintaining the interior reaction zone of said reactor vessel at a temperature ranging from 475° to 650° F. and at a pressure ranging from about 1400 to 3000 psig,
(B) means for charging to said reactor vessel an aqueous slurry containing from about 0.5 to about 50.0 weight percent of coal on a 100 weight percent total slurry basis, said coal being substantially in the form of small particles, at a pressure of from about 1400 to 3000 psig,
(C) means for charging to said reactor vessel a gas containing from about 10 to 100 weight percent of oxygen on a 100 weight percent total gas basis at a pressure ranging from about 1400 to 3000 psig,
(D) means for admixing said slurry and said gas in said reactor vessel,
(E) means for removing the resulting reactant mixture from said reactor vessel,
(F) means for controlling the respective rates of said slurry charging, said gas charging, and said removing for the components present in said reactor vessel which is at least sufficient for generation therein of an approximately equilibrium composition of oxidizable components and oxidized components at said reaction zone temperature and said reaction zone pressure, and
(G) means for removing from said reactor vessel the heat energy produced in said reactor vessel which is in excess of that needed to sustain in siad reactor vessel said reaction zone temperature and said reaction zone pressure.

33. The apparatus of claim 32 additionaly having a combustion catalyst present in said reaction zone and located therein so that reactant mixture is brought into contact with same.

34. The apparatus of claim 32 wherein said means for conrolling so regulates the respective rates of said slurry chargin said gas charging, and said removing that there is producible in said reactor vessel a residence time for the components present in said reactor vessel which is at least sufficient for sustaining a desired said reaction zone temperature and a desired said reaction zone pressure.

35. The apparatus of claim 32 wherein said reactor vessel is further provided with mixing means for turbulent admixing.

* * * * *